United States Patent

Maeda et al.

[15] 3,646,670

[45] Mar. 7, 1972

[54] METHOD FOR CONNECTING CONDUCTORS

[72] Inventors: Yo Maeda; Satoshi Suzuki; Yoshiharu Nakamura; Yorimitu Masubuchi; Tamotsu Ueyama; Naoki Fukutomi; Hiroshi Takahashi, all of Shimodate-shi, Japan

[73] Assignee: Hitachi Chemical Co., Ltd., Tokyo, Japan

[22] Filed: July 17, 1969

[21] Appl. No.: 842,620

[30] Foreign Application Priority Data

July 19, 1968 Japan....................................43/50518
Feb. 3, 1969 Japan....................................44/7315

[52] U.S. Cl.....................................29/627, 29/628, 29/471.5, 29/471.1, 156/150, 156/151, 156/272

[51] Int. Cl.....................................H01r 43/00

[58] Field of Search....................................29/625–627, 471.5, 29/471.7, 573; 156/150, 151, 228, 272–275

[56] References Cited

UNITED STATES PATENTS

| | | | |
|---|---|---|---|
| 2,876,393 | 3/1959 | Talley et al. | 29/626 X |
| 3,501,832 | 3/1970 | Suburo Iwatu et al. | 29/626 |
| 2,997,521 | 8/1961 | Dahlgren | 29/625 X |
| 3,143,787 | 8/1964 | Babbe | 29/625 |
| 3,290,756 | 12/1966 | Dreyer | 29/626 |
| 3,350,250 | 10/1967 | Suntz et al. | 156/150 |
| 3,374,531 | 3/1968 | Bruce | 29/498 |

*Primary Examiner*—Charlie T. Moon
*Assistant Examiner*—Robert Church
*Attorney*—Craig, Antonelli & Hill

[57] ABSTRACT

Terminals of a large number of conductors bondedly laid on an insulating sheet are connected to the corresponding number of counterpart terminals of conductors bondedly laid on another similar insulating sheet by laying, by plating, a solder layer of readily weldable metal having a low-melting point onto the individual surfaces of the terminals on at least one of the insulating sheets, disposing said sheets one upon another so that the terminals of one of the sheets can coincide with the corresponding counterpart terminals of another sheet in a face-to-face position, and heating the disposed sheets from the outside of at least one of the sheets thereby to weld the solder layer to the counterpart terminals. An adhesive layer can be laid on the surfaces of the insulating sheets to heat-weld the insulating sheets to one another before welding the solder layer to the counterpart terminals. Conductors of one part can be thereby connected to those of the counterpart with less resistance at joints for a very short period of time without any contact of one conductor with another due to migration and bridging of molten solder.

5 Claims, 3 Drawing Figures

INVENTORS
YO MAEDA, SATOSHI SUZUKI, YOSHIHARU NAKAMURA, YORIMITU MASUBUCHI, TAMOTSU UEYAMA, NAOKI FUKUTOMI and HIROSHI TAKAHASHI
BY
Craig, Antonelli, Stewart & Hill
ATTORNEYS

METHOD FOR CONNECTING CONDUCTORS

This invention relates to a method for connecting conductors, which is effectively utilized in connecting a word sheet, a memory material of an electronic computer, to a terminal board by soldering, and more particularly to an improved method for connecting terminals of a large number of conductors bondedly laid on an insulating sheet to the corresponding number of terminals of conductors bondedly laid on another similar insulating sheet.

In connecting a large number of conductors laid in parallel on a flat sheet to another similar group of conductors, a pair of conductors of one part and that of a counterpart has been heretofore soldered one by one by means of a soldering iron. According to this conventional method, it usually takes a very long time, for example, at least several hours, to connect 100 pairs of conductors. Further, it has been technically difficult to connect the conductors with less electrical resistance at the joints. In other words, there has been trouble in the conductance or continuity at the joints. Furthermore, there has been a problem of contact of the adjacent conductors due to migration and bridging of molten solder from one conductor to the adjacent conductor on the same sheet.

In accordance with the present invention, the troubles and problems encountered so far have been completely eliminated.

An object of the present invention is to provide a method for connecting terminals of a large number of conductors bondedly laid on an insulating sheet to the corresponding number of the terminals of the conductors on another similar sheet with less resistance at the joints for a very short period of time.

Another object of the present invention is to provide a method for connecting conductors without any contact with adjacent conductors due to migration and bridging of molten solder from one conductor to an adjacent one on the same sheet.

According to the present invention, terminals of a large number of conductors bondedly laid on an insulating sheet, for example, several hundred conductors bondedly laid in parallel at an interconductor distance as short as about 0.5 mm, can be connected to the same number of the corresponding counterpart terminals of the conductors on another sheet at the same time, that is, without soldering a pair of conductors one by one. The present invention can be carried out particularly effectively when the interconductor distance is shorter and the number of conductors is increased.

According to the present invention, there is provided a method for connecting terminals of a large number of conductors bondedly laid on an insulating sheet to the corresponding number of counterpart terminals of conductors bondedly laid on another similar insulating sheet, which comprises laying by plating a solder layer of readily weldable metal having a low melting point on the individual surfaces of the terminals on at least one of the insulating sheets, disposing said sheets one upon another so that the terminals of one sheet can coincide with the corresponding counterpart terminals of another sheet in a face-to-face position, and heating the disposed sheets from the outside of at least one of the sheets thereby to weld the solder layer to the counterpart terminals. Δ According to the present invention, there is further provided a method for connecting terminals of a large number of conductors bondedly laid on an insulating sheet to the corresponding number of counterpart terminals of conductors bondedly laid on another similar insulating sheet, which comprises laying an adhesive layer on at least one of the insulating sheets if necessary, laying by plating a solder layer of readily weldable metal having a low melting point onto the individual surfaces of the terminals on at least one of the insulating sheets, disposing said sheets one upon another so that the terminals of one sheet can coincide with the corresponding counterpart terminals of another sheet in a face-to-face position, and heating the disposed sheets from the outside of at least one of the sheets thereby to heat-weld the insulating sheets or the adhesive layers to one another or heat-weld the adhesive layer to the opposite insulating sheet and then weld the solder layer to the counterpart terminals.

The present invention will be hereunder described in greater detail by way of embodiments with reference to the accompanying drawings, wherein.

The first stage of the present invention is to lay a solder by plating onto joint parts of conductors bondedly laid on an insulating sheet. In accordance with the present invention, the solder plating is carried out on the basis that solder can be laid on a large number of joint parts at the same time and deposition of solder in excess of the necessary amount is meaningless.

Figure 1:
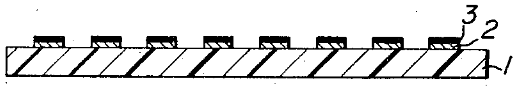
FIG. 1 is a cross-sectional view of an insulating sheet on which a large number of conductors having a solder plating layer on their individual surfaces are bondedly laid at definite distances in parallel.

In FIG. 1, numeral 1 is an insulating sheet, 2 a conductor and 3 a solder layer.

The second stage of the present invention is to dispose a conductor of one part having a solder layer upon those of the counterpart having a solder layer in a face-to-face position. In that case, there is no problem if the surfaces of a pair of the conductors to be bonded are flat, but when the surfaces of the conductors of one part are in a semispherical convex, it is preferable that the surfaces of the counterpart are in a mating semispherical concave. It is possible to lay a solder layer only on the surfaces of the conductors of one part.

Figure 2:
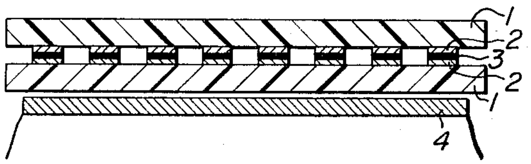
FIG. 2 is a cross-sectional view showing a state to connect conductors on two insulating sheets, as shown in FIG. 1, by disposing one upon another in a face-to-face position and using a heater.

The third stage of the present invention is to bond the terminals of conductors to be connected by allowing a heater to come in contact with conductors in a direction perpendicular to the conductors and setting the temperature of the heater to the melting point of the solder or to a temperature at which the solder can melt and flow. The bonding can be readily effected thereby. In FIG. 2, numeral 4 is a heater. The necessary conditions for such bonding are that the solder on one conductor must not be melted in excess of the necessary amount and allowed to migrate to the adjacent conductor.

More precise and favorable results can be obtained if heating is effected under a constant pressure in advance and the pressure is reduced after cooling and solidification of the solder layer to uniformly connect a large number of conductors to the corresponding number of counterpart conductors.

Another embodiment of the present invention will be explained with reference to FIG. 3.

Also in such a case, the first stage of the present invention is to lay by plating a solder layer onto the connecting terminals of the conductors bondedly laid on the insulating sheet, and the second stage of the present invention is to dispose the conductors of one part having the solder layer upon the conductors of counterpart having the solder layer in a face-to-face position. It is possible to lay the solder layer at least only onto the conductors of either one part or counterpart.

The third stage of the present invention is to allow a heater to come in contact with the conductors in a direction perpendicular to the conductors and be pressed upon the conductors, and set the temperature of the heater above the melting point of the insulating sheet holding the conductors but less than the melting point of the solder thereby to bond two insulating sheets, each holding the conductors to be connected.

As the insulating sheet, a polyvinyl chloride sheet, polyethylene sheet, epoxy resin-impregnated glass flexible sheet, polyimide sheet, polyamide sheet, polyethylene terephthalate sheet, linear fluorine compound sheet, etc. are used in the present invention. However, the polyvinyl chloride sheet, polyethylene sheet, and epoxy resin-impregnated glass flexible sheet are heat-bondable by themselves, and thus when these sheets are used, they can be simply heat-bonded to one another at the third stage of the present invention. When other sheets having a poor heat bonding quality are used, an adhesive layer is laid onto such insulating sheets and the insulating sheets are heat-bonded to one another by the help of said adhesive layer at the third stage of the present invention.

In that case, a mixture of a thermoplastic-saturated polyester and an isocyanate compound is used as a preferable adhesive for the polyimide sheet, polyamide sheet and polyethylene terephthalate sheet, and a mixture of NBR and vinyl ether, etc. are used as preferable adhesives for the linear fluorine compound sheet. Even when such heat-bondable sheets as the polyvinyl chloride sheet are used, more favorable result can be obtained by using an adhesive consisting of a mixture of phenol resin, butyral resin, NBR, and the like.

The fourth stage of the present invention is to set the heater to a temperature at which the solder can be melted and flow and thereby bond the conductors to the corresponding counterpart conductors.

Figure 3:
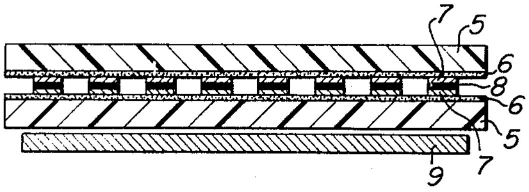
FIG. 3 is a cross-sectional view of another embodiment showing the same state as in FIG. 2.

FIG. 3 shows a cross-sectional view of the two insulating sheets disposed one upon another in a face-to-face position, a large number of conductors being bondedly laid on each sheet at definite distances in parallel and a solder layer being laid by plating on the individual terminal of the conductors, where the conductors are welded to the counterpart conductors by the help of a heater.

In FIG. 3, numeral 5 is the insulating sheets, 6 the adhesive layer, 7 the conductors, 8 the solder layer and 9 the heater. In that case, the adhesive layer 6 is laid all over the surfaces of these two insulating sheets 5, but it is not necessary to lay the adhesive layer 6 between the insulating sheets 5 and the conductors 7. Thus, the adhesive layer may be laid only on the bonding surfaces of the insulating sheets. In that case, care should be naturally taken not to lay the adhesive on the conductor surfaces.

The present invention will be explained hereunder with reference to Examples.

EXAMPLE 1

A polyethylene terephthalate sheet having a thickness of 100 μ, on which 200 copper foils having a thickness of 30 μ and a width of 0.4 mm. were bondedly laid in parallel at distances of 0.3 mm, which is referred to as Sheet A, and a glass cloth laminate sheet having a thickness of 7 mm. on which the same number of the same copper foils were bondedly laid in the same manner as in Sheet A, which is referred to as Sheet B, were subjected to plating, whereby a solder having a melting point of 185° C. was laid to a thickness of 7 μ on the terminal surfaces of the conductors to be connected.

Sheet A and Sheet B were disposed one upon another so that the conductors on Sheet A could meet the corresponding counterpart conductors on Sheet B in a face-to-face position, and a heater was allowed to come in contact with the outside of Sheet A through a Teflon sheet as an intervening layer. The results of bonding obtained by changing the conditions of the heater that is, temperature, contact time and exerted pressure, are given in Table 1.

TABLE 1

| Conditions Pressure (kg./cm.²) | Temperature (° C.) | Time (sec.) | Conductance | Result Contact | Deformation |
|---|---|---|---|---|---|
| 0.4 | 200 | 10 | X | O | O |
| 0.4 | 200 | 80 | X | O | O |
| 0.4 | 200 | 60 | Δ | O | Δ |
| 0.4 | 230 | 10 | X | O | O |
| 0.4 | 230 | 20 | Δ | O | O |
| 0.4 | 230 | 30 | O | O | O |
| 0.4 | 260 | 10 | O | O | O |
| 0.4 | 260 | 20 | O | X | Δ |
| 0.4 | 260 | 30 | O | X | X |

Remarks: O : Satisfactory
Δ : Fairly satisfactory
X : Unsatisfactory

EXAMPLE 2

Two polyethylene terephthalate sheets, each having a thickness of 75 μ, on each of which 250 copper foils having a thickness of 20 μ and a width of 0.3 mm. were bondedly laid in parallel at distances of 0.3 mm; were subjected to plating, whereby a solder having a melting point of 185° C. was laid to a thickness of 1 to 2 μ on the terminal surfaces of the conductors to be connected by soldering.

These two sheets were disposed upon one another so that the solder-layered surfaces of the conductors on one sheet could meet those of the corresponding counterpart conductors on another sheet in a face-to-face position, and a nichrome heating wire having a thickness of 0.3 mm; width of 2 mm; length of 300 mm. and resistance of 2 Ω was place on the outside of one of the sheets in a direction perpendicular to the conductors. The results obtained by changing the voltage applied to the nichrome wire and the time of current passage are shown in Table 2.

TABLE 2

| Conditions Pressure (kg./cm.²) | Applied voltage | Time (sec) | Conductance | Results Contact | Deformation |
|---|---|---|---|---|---|
| 1.0 | 20 | 10 | X | O | O |
| 1.0 | 20 | 20 | Δ | O | O |
| 1.0 | 20 | 30 | O | O | O |
| 1.0 | 25 | 10 | X | O | O |
| 1.0 | 25 | 20 | O | O | O |
| 1.0 | 25 | 30 | O | O | O |
| 1.0 | 30 | 20 | O | Δ | Δ |
| 1.0 | 30 | 30 | O | X | X |

Remarks:
O : Satisfactory
Δ : Fairly satisfactory
X : Unsatisfactory

EXAMPLE 3

A polyethylene terephthalate sheet having a thickness of 100 μ, on which 200 copper foils having a thickness of 30 μ and a width of 0.4 mm. were bondedly laid in parallel at distances of 0.3 mm. an adhesive being laid in clearances between one foil and another, which is referred to "Sheet A," and a glass cloth laminate sheet having a thickness of 7 mm., on which the same number of the same copper foils were laid in the same manner as in Sheet A, which is referred to as "Sheet B," were subjected to plating, whereby a solder having a melting point of 185° C. was laid to a thickness of 7 μ on the surfaces of the conductors to be connected.

Sheet A and Sheet B were disposed one upon another so that the solder-layered surfaces of the conductor on Sheet A could meet those of the corresponding counterpart conductors on Sheet B in a face-to-face position, and a heater was allowed to come in contact with the outside of Sheet A through a Teflon sheet as an intervening layer. The temperature of the heater was made to elevate from the ambient temperature upwards in proportion to time by adjusting the voltage.

The results of the bonding obtained by changing the temperature and contacting time of the heater are given in Table 3. In that case, the temperature was slowly elevated from the ambient temperature to the temperature at which the solder starts to melt. At first, bonding took place between the polyethylene terephthalate sheet and the adhesive layer laid in clearances on the glass cloth laminate sheet, whereby the conductors were isolated from the adjacent conductors. Then, the solder layer plated on the conductors was melted, whereby the conductors were bonded to the counterpart conductors. Thus, no contact took place between the conductors on the same sheet at all.

TABLE 3

| Conditions Temperature (°C.) | Time (sec) | Results Conductance | Contact | Transformation |
|---|---|---|---|---|
| 200–240 | 10 | Δ | 0 | 0 |
| 200–240 | 20 | 0 | 0 | 0 |
| 200–240 | 30 | 0 | 0 | 0 |
| 200–260 | 10 | Δ | 0 | 0 |
| 200–260 | 20 | 0 | 0 | 0 |
| 200–260 | 30 | 0 | 0 | 0 |
| 200–280 | 10 | 0 | 0 | 0 |
| 200–280 | 20 | 0 | 0 | Δ |

Remarks:
0 : Satisfactory
Δ: Fairly satisfactory

EXAMPLE 4

The same Sheets A and B as in Example 3 were disposed one upon another in the same manner as in Example 3, and a nichrome heating wire (A) having a thickness of 0.1 mm., width of 5 mm. and length of 300 mm. was placed on the outside of one of the sheets in a direction perpendicular to the conductors, and current was passed through the nichrome wire (A).

Then, another nichrome wire (B) having a thickness of 0.3 mm., width of 2 mm. and length of 300 mm. was placed on the same place as the nichrome wire (A) in the same manner as with the wire (A), and current was passed through the wire (B).

The results obtained by changing the voltage applied the nichrome wires and the time of current passage are given in Table 4.

In the Example, the temperature was slowly elevated from the ambient temperature to the temperature at which the solder starts to melt in the same manner as in Example 3, whereby the bonding took place between the insulating sheets, and then the bonding of the solder layers on the conductors took place. Thus, as shown in Table 4, a word sheet could be obtained without any contact between the conductors on the same sheet.

TABLE 4

| Conditions Nichrome heating wire | Applied voltage (V) | Time (sec) | Results Conductance | Contact | Deformation |
|---|---|---|---|---|---|
| A | 15 | 20 | Δ | 0 | 0 |
| B | 20 | 20 | | | |
| A | 15 | 30 | 0 | 0 | 0 |
| B | 20 | 30 | | | |
| A | 20 | 10 | 0 | 0 | 0 |
| B | 25 | 10 | | | |
| A | 20 | 20 | 0 | 0 | 0 |
| B | 25 | 20 | | | |
| A | 20 | 30 | 0 | 0 | 0 |
| B | 25 | 30 | | | |
| A | 25 | 10 | 0 | 0 | 0 |
| B | 30 | 10 | | | |
| A | 25 | 20 | 0 | 0 | Δ |
| B | 30 | 20 | | | |

Remarks:
0 : Satisfactory
Δ : Fairly satisfactory

According to the present invention, a large number of conductors laid in parallel at definite distances on a flat surface can be connected to the corresponding similar counterpart conductors in a very short period of time, as compared with the conventional, time-consuming, soldering method, by disposing the solder-plated terminals of conductors upon those of the counterpart similar conductors in a face-to-face position in advance and allowing a heater to come in contact with the conductors in a direction perpendicular to the conductors, as explained above.

The heater is a nichrome wire or heating block, but the similar effect can be obtained by pressing the conductors in advance and heat-bonding the conductors by means of an infrared heating source. Thus, the heating source is not limited to any specific one disclosed in Examples in the present invention.

Further, according to the present invention, a large number of conductors having a solder layer on their terminal surfaces, the conductors being bondedly laid on the insulating sheet, can be readily connected to the solder-layered terminals of the corresponding counterpart conductors on another sheet securely without any contact between the conductors and adjacent conductors, by heating the heater so that the heat bonding can take place between the insulating sheets at first and then the conductors can be bonded at a temperature at which the solder is sufficiently melted and flows.

When the temperature of the heater is elevated over the melting point of the solder from the beginning, the component materials may take uneven distribution of thickness, the heater may take uneven distribution of temperature as well as uneven distribution of exerted pressure. Consequently, the solder is melted and flows to the adjacent conductors, whereby there takes place a problem of contact between the conductors and the adjacent conductors. In other words, it is very difficult to select a condition that no molten solder flow in a direction perpendicular to the conductors. Such problem is completely overcome in the present invention.

Use of a heater having a larger width as the first heater than that of the second heater, as in Example 4 is an effective means for attaining a greater effect.

Further, when the continuous temperature elevation of the heater as in Example 3 is compared with two-step temperature elevation as in Example 4, the latter two-step temperature elevation is superior in security to the former continuous temperature elevation, though the latter takes somewhat more time. In any way, the same effect can be attained, irrespectively of continuous heating or stepwise heating.

As explained above, a large number of conductors bondedly laid in parallel in definite distances on the insulating sheet can be simply, efficiently and securely connected to the corresponding counterpart conductors according to the present invention, for example, as in the case of connecting, by soldering, the conductors on a terminal board to a word sheet, memory material for an electronic computor.

What is claimed is:

1. A method for connecting terminals of a large number of conductors bondedly laid on an insulating sheet to the corresponding number of counterpart terminals of conductors bondedly laid on another similar insulating sheet, which comprises forming a heat-bondable adhesive layer on the surface of at least one of the insulating sheets, positioning a plurality of terminals in closely spaced relation on said adhesive layer, plating a solder layer of readily-bondable metal having a low melting point onto the individual surfaces of the terminals on at least one of the insulating sheets, disposing said sheets one upon another so that the terminals of one sheet are positioned on the corresponding counterpart terminals of the other sheet in a face-to-face position, and heating the disposed sheets from the outside of at least one of the sheets and heat-bond the insulating sheets by way of adhesive layer to one another without melting said solder layer and then further heating the sheets from the outside to solder the terminals to their corresponding counterpart terminals.

2. A method according to claim 1, wherein the adhesive layer melts at a temperature lower than the solder layer.

3. A method according to claim 2, wherein the insulating sheets disposed one upon the other are first bonded by heating to a temperature above the melting point of the adhesive layer but less than the melting point of the solder layer and then soldering the terminals to their counterpart terminals by raising the temperature above the melting point of the solder layer.

4. A method according to claim 3, wherein the sheets are bonded by raising the temperature from ambient to above the melting point of the solder layer at a rate that the insulating sheets become bonded, thereby isolating the terminals, before the solder layer melts.

5. A method according to claim 3, wherein the sheets are maintained at a temperature above their melting point but below the melting point of the solder layer until they are bonded and then the temperature is raised and maintained above the melting point of the solder layer until the terminals are soldered together.

* * * * *